(12) United States Patent
Boger et al.

(10) Patent No.: US 8,002,905 B2
(45) Date of Patent: Aug. 23, 2011

(54) FLUXING AGENT FOR SOLDERING METAL COMPONENTS

(75) Inventors: Snjezana Boger, Esslingen (DE); Peter Englert, Bad Friedrichshall (DE); Matthias Pfitzer, Aalen (DE); Sabine Sedlmeir, Pfalzgrafenweiler (DE); Ingo Trautwein, Bietigheim-Bissingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 701 days.

(21) Appl. No.: 10/562,154

(22) PCT Filed: Jun. 25, 2004

(86) PCT No.: PCT/EP2004/006894
§ 371 (c)(1),
(2), (4) Date: Dec. 23, 2005

(87) PCT Pub. No.: WO2004/113014
PCT Pub. Date: Dec. 29, 2004

(65) Prior Publication Data
US 2006/0162817 A1    Jul. 27, 2006

(30) Foreign Application Priority Data
Jun. 25, 2003 (DE) .................................. 103 28 745

(51) Int. Cl.
*B23K 35/363* (2006.01)
*B23K 1/20* (2006.01)

(52) U.S. Cl. ............................ 148/24; 219/615; 228/214

(58) Field of Classification Search ................... 977/775, 977/778, 783; 148/23, 24, 240, 243, 248, 148/275; 165/133, DIG. 512, DIG. 513, 165/DIG. 514; 219/615; 228/207, 214, 262.61, 228/262.9
See application file for complete search history.

(56) References Cited

U.S. PATENT DOCUMENTS

| | | | |
|---|---|---|---|
| 3,971,501 A | 7/1976 | Cooke | |
| 5,518,555 A | 5/1996 | Ouyang et al. | |
| 5,795,659 A | 8/1998 | Meelu et al. | |
| 5,916,635 A * | 6/1999 | Ishii et al. | 427/388.2 |
| 5,962,145 A | 10/1999 | Matsukawa | |
| 5,964,963 A | 10/1999 | Turchan et al. | |
| 6,432,221 B1 | 8/2002 | Seseke-Koyro et al. | |
| 6,880,746 B2 | 4/2005 | Seseke-Koyro et al. | |
| 2002/0070263 A1 | 6/2002 | Seseke-Koyro et al. | |
| 2006/0196579 A1 * | 9/2006 | Skipor et al. | 148/24 |
| 2006/0196644 A1 * | 9/2006 | Boger et al. | 165/133 |
| 2007/0114011 A1 * | 5/2007 | Mamber | 165/133 |
| 2008/0038471 A1 * | 2/2008 | Boger et al. | 427/374.1 |

FOREIGN PATENT DOCUMENTS

| | | | |
|---|---|---|---|
| CN | 1413797 | * | 4/2003 |
| DE | 26 14 872 A1 | | 10/1976 |
| DE | 199 13 111 A1 | | 9/1999 |
| DE | 100 15 486 A1 | | 10/2001 |
| DE | 1287941 | * | 3/2003 |
| EP | 0 556 864 A1 | | 8/1993 |
| EP | 0 659 519 B1 | | 9/2001 |
| EP | 1 154 042 A1 | | 11/2001 |
| GB | 1 542 323 | | 3/1979 |
| JP | 61-049771 A | | 3/1986 |
| WO | WO 00/73014 A1 | | 12/2000 |
| WO | WO 01/74530 A1 | | 10/2001 |
| WO | WO 03/072288 A1 | | 9/2003 |

OTHER PUBLICATIONS

Patent Abstract, CN 1 413 797, Univ. Harbin Polytechnic, Apr. 30, 2003.
D.C. Lin et al., "An investigation of nanoparticles addition on solidification kinetics and microstructure development of tin-lead solder," Materials Science Engineering, Bd. A 360, Nov. 15, 2003, p. 285-292.

* cited by examiner

*Primary Examiner* — Roy King
*Assistant Examiner* — Mark L Shevin
(74) *Attorney, Agent, or Firm* — Foley & Lardner LLP

(57) ABSTRACT

The aim of the invention is to provide a fluxing agent for soldering components, which creates one or more specific surface characteristics during the soldering process itself, thus obviating the need for the surface treatment process that is conventionally carried out after the soldering process. To achieve this, nanoparticles are added to a base substance.

29 Claims, No Drawings

FLUXING AGENT FOR SOLDERING METAL COMPONENTS

The invention relates to a flux for brazing metal components. It also relates to a process for producing a flux of this type, to a brazing process and to a use of a flux of this type.

To braze metallic materials, it is necessary for the oxide layer formed on their surfaces to be at least partially removed prior to brazing and not to be formed again during the brazing process. This is generally achieved using special solvents for metal oxides, known as fluxes.

On account of the special materials properties of the metals, it is often desirable to apply a noncorrosive, non-hygroscopic flux. DE 199 13 111 A1 discloses zinc-containing fluxes, in which the zinc fraction produces a corrosion-resistant surface on aluminum-based components. EP 0 659 519 B1 also discloses a zinc-containing flux for improving the resistance to corrosion. DE 100 154 86 A1 has disclosed potassium and/or cesium fluorostannates as fluxes for brazing magnesium-containing aluminum materials. It is known from WO 00/73014 A1 to produce an aluminum-silicon coating by applying alkali metal hexafluorosilicate as flux to components made from aluminum or aluminum alloys and heating, and this aluminum-silicon coating is effectively protected from reoxidation by the simultaneous formation of a noncorrosive potassium fluoroaluminate layer.

For the brazing of individual parts for heat exchangers, i.e. in particular radiators as used in the automotive industry, if the base material used is aluminum or aluminum alloys, it is currently customary to deploy special brazing processes, in particular what is known as "Nocolok" brazing (cf. for example DE-A 26 14 872). This brazing process uses a flux based on potassium fluoroaluminates with the empirical formula $K_{1-3}AiF_{4-6}$, which is commercially available under the name "Nocolok". This "Nocolok" flux remains on the surface after the brazing operation and covers it with a crystalline layer.

To satisfy the industry demands on components, for example aluminum heat exchangers in the automotive sector, as are currently used for example in air-conditioning systems, with regard to desired properties, such as corrosion-resistant, hydrophilic and/or adhesive surfaces and/or a decorative appearance, it is in many cases impossible to avoid the need for a surface treatment following the brazing process.

There are various standard processes available as surface treatment processes for aluminum, for example cleaning and conversion treatments using chromating or phosphating processes. The layers deposited increase the chemical stability of the support material and improve the adhesion of paint and plastic coatings (G. Stolzenfels, "Chemische Oberflächenbehandlung von NE-Metallen vor dem Aufbringen organischer Beschichtungssysteme" [Chemical surface treatment of nonferrous metals prior to the application of organic coating systems], Industrie-Lackier-Betrieb, volume 44. (1976), No. 3, pp. 93-98, Curt R. Vincentz Verlag; L. de Riese-Meyer, L. Kintrup, H.-D. Speckmann, "Bildung und Aufbau Chrom (VI)-haltiger Konversionsschichten aus Aluminium" [Formation and structure of chromium(VI)-containing conversion layers of aluminum], offprint from Aluminium, volume 67 (1991), No. 12, pp. 1215-1221).

U.S. Pat. No. 5,795,659 describes a treatment of the aluminum surface with zirconium, hafnium, rhenium, manganese, titanium, silicates and borates to protect against corrosion and high-temperature corrosion. U.S. Pat. No. 5,584,946 describes a chromium-free pretreatment and surface treatment process based on complex fluorides of the elements boron, zirconium, hafnium and titanium. U.S. Pat. No. 5,962,145 describes a surface treatment process based on complex fluorides of the elements boron, zirconium, titanium, silicon, germanium, tin in combination with polymers. Meanwhile, U.S. Pat. No. 5,518,555 has disclosed a surface treatment process which is free of heavy metals, in particular chromium, and free of silicate and fluorine, and is instead based on an anionic polyacrylamide copolymer in an aqueous solution to improve the corrosion resistance and surface adhesive properties.

The field of nanotechnology surface treatments also comprises a wide range of processes. Examples from the production of nanoparticles include comminuting, spraying, flame syntheses, plasma processes, laser ablation, gas phase synthesis, sol-gel processes, spark erosion and crystallization. Particles with primary particle sizes in the range of 100 nanometers and below are distinguished by a particularly high ratio of surface area to volume. Since the adhesion and bonding of the particles increases with increasing surface area, layers produced by these treatments are generally scratch-resistant and abrasion-resistant. The wettability and dirt adhesion of even large areas can be considerably reduced in this case, so that a virtually complete self-cleaning effect can be achieved even just by the action of rain.

The cosmetics industry uses nanoscale titanium dioxide particles as UV absorbers and therefore as effective filters in sunscreen agents. These particles do not scatter any light in the visible wavelength region, which means that the sunscreen is no longer white, but rather is transparent. On account of the higher surface area/volume ratio, the UV absorption is better than with conventional particle sizes. Furthermore, nanoparticles are used in a polymer matrix, for example for transparent conductive coatings.

In industrial application, in addition to the conventional nanoscale pigments, such as carbon blacks, iron oxides or silica sols, further nanoparticles, for example zirconium oxides, are also available. For example, EP 1 154 042 A1 has disclosed a heat exchanger which has a chromium-containing or zirconium-containing conversion layer and a hydrophilic polymer-based layer which contains silica particles with a diameter of between 5 and 1000 nm. This provides both corrosion protection for the surface and easier cleaning and therefore suppression of the noise emission. The incorporation of the nanoparticles into a polymer and the common application of these two constituents to the surface, however, requires a dedicated production step, with corresponding outlay on equipment.

To avoid having to carry out a surface treatment following the brazing process, it is desirable to have available a flux with which one or more specific surface properties are produced even during the brazing operation.

The invention is therefore based on the object of providing a flux which is suitable for brazing metal components and eliminates the entire surface treatment process which otherwise usually takes place at a later stage. Furthermore, it is intended to provide a process for producing a flux of this type, a brazing process and a use of a flux of this type.

With regard to the flux, the object is achieved according to the invention by adding nanoparticles to a base material.

In this context, the invention is based on the consideration that a flux used for the brazing of components should be realized in such a manner that there is no longer any need for a surface treatment of the associated component in order to apply functional coatings, which entails further working steps and further outlay on apparatus. To save on later processes, materials which are classified as suitable are added to a base material before or during the brazing process, depending on the selected intended use. This means that a specific surface coating can be formed as early as during the brazing operation. With regard to the deployment of material, tailored structures play an important role in particular for desired functions of the coating systems, such as for example special photocatalytic and/or adhesion properties. The dimensions or sizes of individual materials and mixtures are a significant factor in determining their formation. For a particularly finely structured surface configuration, particles with diameters of a few millionths of millimeters are provided as additive to the base material. Nanoparticles of this type have a much smaller number of structural defects compared to larger particles of the same chemical composition. Therefore, on account of their geometric and material-specific properties, they offer a particularly wide and versatile range of actions. For example, nanoscale particles are distinguished by a particularly high surface area/volume ratio. This results in a particularly good resistance to scratching and abrasion and/or a particularly effective UV absorption on nanocoated surfaces.

The resistance to corrosion is improved as early as during brazing, without any further prior or subsequent treatment, by using suitably selected nanoscale additives. Furthermore, the adhesion of a paint which may subsequently be applied can be improved by the addition of nanoparticles. The formation of odors can also be reduced. Moreover, the addition of certain nanoparticles, such as for example carbon nanoparticles, also improves the thermal conductivity of the coating, for example the flux layer.

Furthermore, the water run-off is improved when producing a functional hydrophilic surface. This promotes the self-cleaning effect of the surface, and faster drying of the surface is achieved by promoting the formation of a relatively thin film of water. These self-cleaning and fast drying properties also minimize the growth of microorganisms. All these factors improve the usability and/or performance of coated components.

To form a functional surface coating as early as during the brazing operation, the proportion of nanoparticles added is preferably between 0.01% by volume and 10% by volume, depending on the selected type of material or compound and the respective intended use.

Depending on the intended use selected, nanoscale pigments and/or nanoaggregates dispersed in an organic polymer (known as nanopaints), comprising oxides, oxide hydrates, nitrides, carbides of aluminum, silicon and boron as well as transition metals, preferably from transition groups IV and V, and cerium, and/or coated nanoparticles and/or grafted nanoparticles of the abovementioned substances or compounds and/or carbon nanoparticles are preferably added to the base material as nanoparticles.

The organic polymer in this case functions as a binder between the base material and the nanoparticles. To achieve a particularly effective binding action between the base material and the nanoparticles, the proportion of organic polymer in the mixture after drying is preferably between approximately 0.01% by volume and 10% by volume.

In a particularly advantageous embodiment of the flux, the polymer used is polyurethanes, synthetic resins, phthalates, acrylates, vinyl resins, silicone resins and/or polyolefins.

In many cases, nanoparticles have mechanical, electrical, magnetic or optical properties which differ significantly from those of macroscopic bodies. To preserve particle-size-dependent physical properties of individual particles in a component, it is preferable for nanoparticles to be coated. For this purpose, a skin which serves as a spacer or insulator is placed around an inner core which has the desired materials properties. A process for producing coated nanoparticles of this type can be implemented by reacting precursor compounds with a reaction gas in a microwave plasma. A combination of a plurality of these process steps produces coated particles which still have a total diameter of just a few nanometers.

To modify the interactions and structures at surfaces, for example to produce switchable surfaces with alternatively hydrophobic and hydrophilic properties, it is possible for chains of different components which have such properties, on account of rearrangement of the chains, to be grafted onto nanoparticles.

For a particularly advantageous configuration of the flux, potassium fluoroaluminates with the empirical formula $K_{1-3}AlF_{4-6}$, which are commercially available under the name "Nocolok" and are nowadays frequently used as flux for aluminum brazing, are partly used as the base material. In this case, the potassium fluoroaluminate, for example according to the Solvay Fluor und Derivate GmbH product specification, has the following composition K 28-31% by weight, F 49-53% by weight, Fe max. 0.03% by weight, Ca max 0.2% by weight.

For another or alternative, particularly advantageous configuration of the flux, the base material used is potassium and/or cesium fluorostannates with the empirical formulae $KSnF_3$ and $CsSnF_3$.

With regard to the process for producing a flux, the abovementioned object is achieved by virtue of the fact that nanoparticles are produced by a physical route, in particular by dispersion methods or ultrafine wet milling and are added to a base material prior to the brazing process. Starting from a diameter of a few micrometers, suspended particles can be comminuted to a range from 40 to 100 nm in modern stirred ball mills. A physical process of this type for producing nanoparticles from larger particles is known as a top-down process. One significant element of the processing of nanoproducts of this type is the stabilizing of the particles in the suspension by means of suitable additives.

According to an alternative process for producing a flux, the abovementioned object is achieved by virtue of the fact that nanoparticles are firstly dispersed in an organic polymer and then added as a nanopaint to a base material prior to the brazing process. In the brazing furnace, the polymeric constituents decompose to form low-molecular volatile constituents, so that after brazing it is usually no longer possible to detect any polymeric residues.

With regard to the process for brazing metal components, the abovementioned object is achieved by using a flux as described above.

According to an alternative process for brazing metal components, the abovementioned object is achieved by virtue of the fact that starting materials for nanoparticles are added to a base material prior to the brazing process and nanoparticles which are formed by a chemical reaction during the brazing process are deposited on the component surface. The reaction in this case preferably takes place at a temperature in a range between 350° C. and 660° C., particularly preferably up to 600° C., and in a nitrogen atmosphere. A chemical process of this type for producing nanoparticles is known as a bottom-up process. The starting materials for nanoparticles used are advantageously carbon, oxides, oxide hydrates, nitrides and/or carbides of aluminum, silicon, boron and/or transition metals, preferably from transition groups IV and V of the periodic system, and/or cerium. The base material used is preferably potassium fluoroaluminates with the empirical formula $K_{1-3}AlF_{4-6}$ or potassium and/or cesium fluorostannates with the empirical formulae $KSnF_3$ and $CsSnF_3$.

A flux as described above is expediently used to produce nanocoated components, in particular heat exchangers, based on aluminum or aluminum alloys for the automotive industry.

The advantages achieved by the invention consist in particular in the fact that adding nanoparticles to a base material which has proven a suitable means for dissolving oxidation products on metal components and for preventing further oxidation during the brazing process provides a flux which can be used to produce desired effects and surface properties of the associated component as early as during brazing. A nanoparticle-containing flux of this type obviates the entire surface treatment process which otherwise usually follows the brazing operation. The selected use of nanoscale particles of different materials, if appropriate with properties which have been modified or preserved by dispersing in a polymer or by coating, produces the desired functionality of a component surface. Surface-coating components in this way makes it possible, for example, to produce self-cleaning and antimicrobial surfaces, and allows the corrosion prevention, the hardness and scratch resistance and/or the appearance of the relevant components to be improved. The abovementioned properties enhance the usability and/or performance of these components.

An exemplary embodiment is a flux in which nanoscale titanium dioxide particles are added to potassium fluoroaluminates, provided as base material, with the empirical formula $K_{1-3}AlF_{4-6}$, which are commercially available under the name "Nocolok". For this purpose, 3% by volume of titanium dioxide particles and 772 g of potassium fluoroaluminates are added with stirring to a mixture of 300 ml of polyurethane binder and 700 ml of deionized water, followed by stirring for about 30 minutes at 20 000 rpm. Subsequent filtration of the mixture over a stainless steel screen with a mesh size of 250 μm produces 1.5 kg of a ready-to-use flux having the following composition: 42% by weight of potassium fluoroaluminates, 3% by volume of titanium dioxide particles, 2.6% by weight of polyurethane binder and 52.4% by weight of deionized water.

Using this nanoparticle-containing flux to braze aluminum components, in particular aluminum heat exchangers, produces a photocatalytic coating which, in combination with UV light, leads to the oxidation of organic impurities. This also produces a cleaning effect removing organic deposits from the aluminum surface. Consequently, a reduction in the overall performance caused by contamination during heat transfer is prevented and the growth of microorganisms is minimized.

The invention claimed is:

1. A brazing flux for the brazing of individual heat exchanger parts, comprising:
   a flux, comprising a base material, an organic polymer, and nanoparticles,
   wherein the flux contains nanoparticles in an amount between 0.01% by volume and 10% by volume, and
   wherein the nanoparticles comprise nanoaggregates dispersed in the organic polymer,
   wherein the base material used is potassium fluoroaluminates with the empirical formula $K_{1-3}AlF_{4-6}$ or potassium and/or cesium fluorostannates with the empirical formulae $KSnF_3$ and $CsSnF_3$,
   wherein the nanoparticles comprise at least one kind of nanoparticle selected from the group consisting of carbon nanoparticles, nanoscale pigments oxides, oxide hydrates, nitrides, transition metals, carbides of aluminum, carbides of silicon, carbides of boron, and cerium.

2. The flux as claimed in claim 1, wherein a proportion of the organic polymer in the flux after drying is between approximately 0.01% by volume and 10% by volume.

3. The flux as claimed in claim 2, in which the organic polymer used is polyurethanes, synthetic resins, phthalates, acrylates, vinyl resins, and/or polyolefins.

4. A process for producing the flux as claimed in claim 1, in which nanoparticles are first dispersed in the organic polymer and then added as nanopaint to the base material prior to the brazing process.

5. A process for brazing individual heat exchanger parts, comprising brazing individual heat exchanger parts with the flux as claimed in claim 1.

6. The flux as claimed in claim 1, wherein the flux contains nanoparticles in an amount between 0.1% by volume and 1% by volume.

7. The flux as claimed in claim 1, wherein the transition metals are transition metals of groups IV and V of the periodic system.

8. The flux as claimed in claim 1, wherein the kind of nanoparticle is a nanoscale pigment.

9. The flux as claimed in claim 1, wherein the kind of nanoparticle is an oxide.

10. The flux as claimed in claim 1, wherein the kind of nanoparticle is a nitride.

11. The flux as claimed in claim 1, wherein the kind of nanoparticle is a carbide of aluminum, a carbide of silicon, or a carbide of boron.

12. The flux as claimed in claim 1, wherein the kind of nanoparticle is a transition metal.

13. The flux as claimed in claim 12, wherein the transition metal is cerium.

14. The flux as claimed in claim 1, wherein the kind of nanoparticle is a carbon nanoparticle.

15. The flux as claimed in claim 1, wherein the kind of nanoparticles is a coated nanoparticle.

16. The flux as claimed in claim 1, wherein the kind of nanoparticles is a grafted nanoparticle.

17. The flux as claimed in claim 1, wherein the nanoparticles improve a resistance to corrosion of a metal component brazed with the flux, as compared to a flux without the nanoparticles.

18. The flux as claimed in claim 1, wherein the nanoparticles improve an adhesion of paint of a metal component brazed with the flux, as compared to a flux without the nanoparticles.

19. The flux as claimed in claim 1, wherein the nanoparticles reduce an odor of the flux, as compared to a flux without the nanoparticles.

20. The flux as claimed in claim 1, wherein the nanoparticles improve a thermal conductivity of the flux, as compared to a flux without the nanoparticles.

21. The flux as claimed in claim 1, wherein the nanoparticles improve a water runoff property of a metal component brazed with the flux, as compared to a flux without the nanoparticles.

22. The flux as claimed in claim 21, wherein the water runoff property provides a self-cleaning effect for the metal component.

23. The flux as claimed in claim 22, wherein the water runoff property further provides a faster drying effect for the metal component.

24. The flux as claimed in claim 23, wherein the self-cleaning effect and the faster drying effect minimize the growth of microorganisms on the metal component.

25. The flux as claimed in claim 1, wherein the nanoparticles have a diameter of a few nanometers.

26. The flux as claimed in claim 1, wherein the nanoparticles have a diameter of 40 to 100 nm.

27. The flux as claimed in claim 1, wherein the nanoparticles comprise switchable surfaces, wherein the switchable surfaces are alternatively switchable between hydrophobic surfaces and hydrophilic surfaces.

28. The flux as claimed in claim 1, wherein the organic polymer used is polyurethanes, synthetic resins, phthalates, acrylates, vinyl resins, and/or polyolefins.

29. The flux as claimed in claim 2, wherein the proportion of organic polymer in the flux after drying is between 0.1% by volume and 1% by volume.

\* \* \* \* \*